United States Patent [19]
Tessera

[11] 3,956,738
[45] May 11, 1976

[54] CONTROL UNIT FOR A MICROPROGRAMMED COMPUTER WITH OVERLAPPING OF THE EXECUTIVE AND INTERPRETATIVE PHASE OF TWO SUBSEQUENT MICROINSTRUCTIONS

[75] Inventor: Giancarlo Tessera, Milan, Italy

[73] Assignee: Honeywell Information Systems, Inc., Phoenix, Ariz.

[22] Filed: Sept. 24, 1974

[21] Appl. No.: 508,785

[30] Foreign Application Priority Data
Sept. 25, 1973 Italy .................................. 29387/73

[52] U.S. Cl. .......................................... 340/172.5
[51] Int. Cl.² ......................................... G06F 9/00
[58] Field of Search ................................. 340/172.5

[56] References Cited
UNITED STATES PATENTS

| | | |
|---|---|---|
| 3,631,405 | 12/1971 | Hoff ................................. 340/172.5 |
| 3,638,199 | 1/1972 | Kolankowsky et al. ........... 340/172.5 |
| 3,648,246 | 3/1972 | Zurla ................................. 340/172.5 |
| 3,673,575 | 6/1972 | Burton et al. ..................... 340/172.5 |
| 3,689,895 | 9/1972 | Kitamura ........................ 340/172.5 |
| 3,742,457 | 6/1972 | Calle et al. ....................... 340/172.5 |

*Primary Examiner*—Raulfe B. Zache
*Attorney, Agent, or Firm*—Edward W. Hughes; William W. Holloway, Jr.

[57] ABSTRACT

An apparatus is disclosed for calling a microinstruction stored in main memory while another microinstruction from main memory is executing, thus permitting an overlap of the executing phase with the call phase of an instruction. A hardware sequencer examines predetermined characteristics of an executing microinstruction and takes appropriate action in response to such examination.

3 Claims, 4 Drawing Figures

CONTROL UNIT FOR A MICROPROGRAMMED COMPUTER WITH OVERLAPPING OF THE EXECUTIVE AND INTERPRETATIVE PHASE OF TWO SUBSEQUENT MICROINSTRUCTIONS

BACKGROUND OF THE INVENTION

1. Field of the Invention

The present invention relates to microprogrammed computers, wherein different operations are performed under control of a sequence of microinstructions forming a microprogram in firmware for managing the control system.

2. Description of Prior Art

On another patent application filed by the Applicant concurrently with the application of this invention, there was disclosed a device wherein each microprogram employed for managing the control system is stored either in a Read-Only Store (ROS), specifically dedicated to the microprograms, or in the Main Memory of the computer, thus making it possible to extend the set of microprograms of the computer without modifying the physical structure of the same. That patent application describes a preferred circuit embodiment which allows the use of microprograms stored in Main Memory, and clearly shows how execution of the microinstructions, or a sequence thereof, stored in the Main Memory, requires more time than the execution of microinstructions stored in the microprogram (ROS) memory. The reason for the increased execution time is that during the execution phase each microinstruction must always be preceded by a calling phase of the same microinstruction, which in turn requires at least one machine cycle.

OBJECTS OF THE INVENTION

It is an object of the invention to provide means for obviating, at least partially the above difficulties, by overlapping in time the execution phase of a microinstruction, and the call phase of the following microinstruction in every case when this is possible.

It is another object of the invention to provide a "hardware sequencer," whose operation depends on the result of an examination of prefixed characteristics of the microinstruction being executed.

SUMMARY OF THE INVENTION

According to the invention microinstructions may be stored in a random access main memory or in an ROS memory, and may be retrieved from either one in the execution of a microprogram. Since more time is consumed in accessing microinstructions from main memory than from ROS memory, means are provided to permit the temporal overlap of the execution phase of a first microinstruction with the call phase of a second microinstruction to be executed after said first microinstruction.

A hardware sequencer is also provided whose operation depends on the result of an examination of predetermined characteristics of the microinstruction being executed.

BRIEF DESCRIPTION OF THE DRAWINGS

These and other objects and advantages of the invention will appear clearly from the detailed description of a preferred embodiment thereof, and from the attached drawings, wherein.

DESCRIPTION OF A PREFERRED EMBODIMENT

Figure 1:
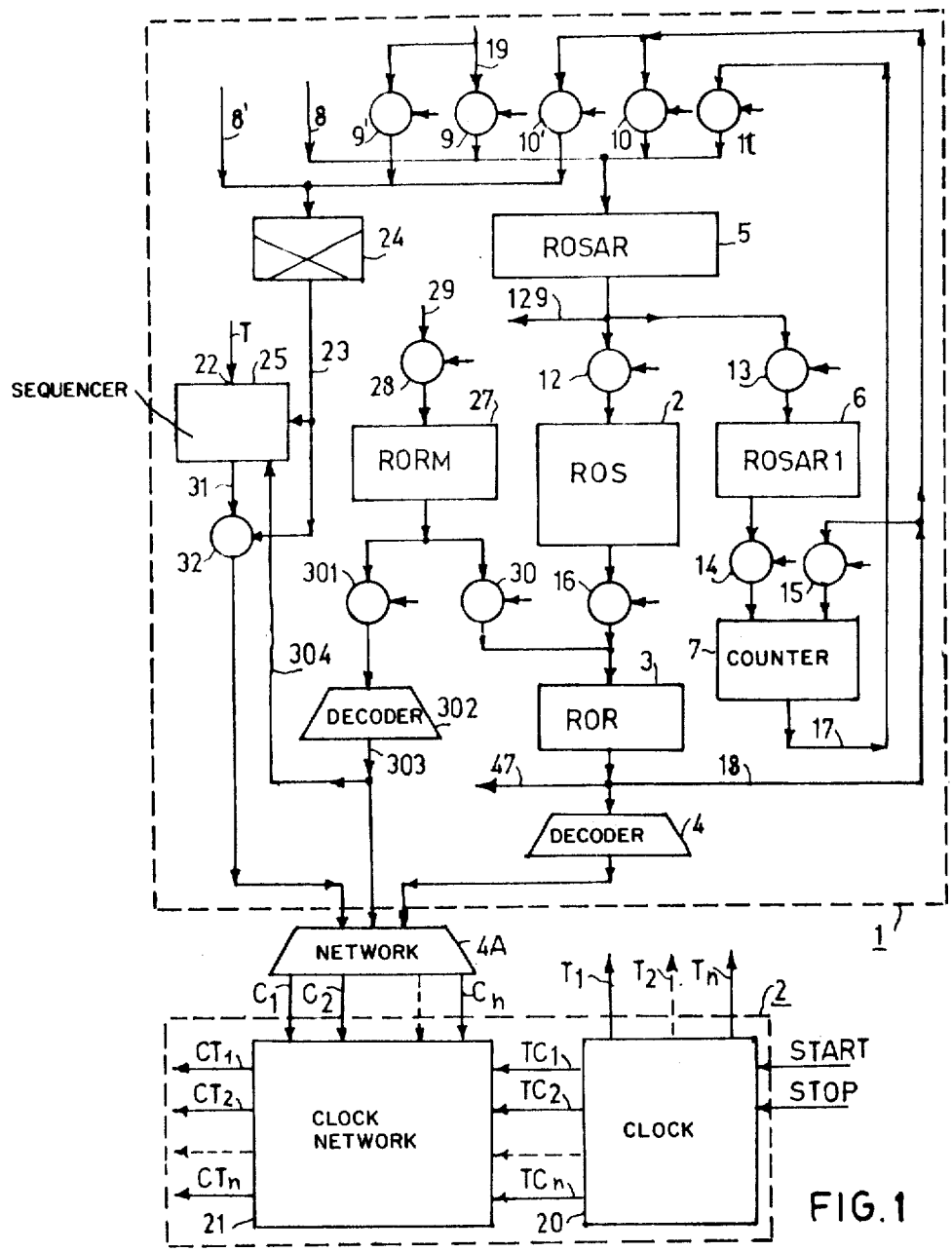
FIG. 1 is a simplified block diagram of a preferred embodiment of the control unit according to the invention.

FIG. 1 shows the control unit 1 and a clock unit 2 of the computer.

The clock unit 2 comprises substantially a clock circuit 20 and a clock network 21.

The clock circuit consists of a delay line with intermediate taps, fed by a one-shot circuit triggered either by an external start signal, or by the end terminal of the delay line for cyclically generating a sequence of clock pulses.

Alternately, it is known how to make use of a high frequency oscillating circuit for generating a basic frequency, from which a sequence of clock pulses is obtained by means of frequency dividers. The operation of the clock circuit may be interrupted at the end of each cycle by means of a command applied to the STOP terminal.

Some of the clock pulses are transferred through the output leads $T_1, T_2, T_3, \ldots T_N$ to different points of the computer where they cyclically control the enabling of predetermined AND gates.

Other clock pulses, $TC_1, TC_2 \ldots TC_N$ are applied to a clock network 21 which is part of the clock unit 2.

The clock network receives from the control unit 1 a plurality of signals, or microcommands, $C_1, C_2, C_3 \ldots C_N$ and, by means of a plurality of AND gates, and, as required, of flip-flops, delivers, under control of the clock pulses $TC_1$ to $TC_N$, a sequence of suitably timed microcommands, having suitable durations, $CT_1$ to $CT_N$, which are distributed, by means of a proper control network, not represented, to suitable points of the computer, including the control unit, the operating section and the memory section.

In FIGS. 1, 2, 3, 4, an arrow pointing to a conditioning element, represented usually by a circle, indicates that a clock pulse $T_1$ to $T_N$, or a clocked microcommand, $CT_1$ to $CT_N$, is applied to the same by the connection represented by the arrow.

The difference between clock pulses and clocked microcommands consists in that, the clock pulses are unconditionally delivered in each cycle of the clock unit (machine cycle), whereas the clocked microcommands are delivered only during the machine cycles in which the corresponding microcommands $C_1$ to $C_N$ are present.

The control unit 1 comprises substantially a read-only store 2A designated ROS, an output register for this store 3 designated ROR (Read-Only Register), a decoder 4, an ROS address register 5 designated ROSAR, an auxiliary register 6 for storing the ROS addresses, designated ROSAR 1, and a counting unit, or counter, 7 for incrementing the addresses.

The ROS memory is designed to store microwords having for example 18 bits, organized in microprograms which control the operation of the computer and are read out by "primitive" (machine) instructions.

The circles 9 to 16 represent sets of AND gates which control the transferring of signals on the connection lines associated to these sets.

Each set 9 to 16 is controlled, as said, either by a clock pulse $T_i$ or by a clocked microcommand $CT_j$.

Specifically, the sets of AND gates 12, 13, 16 are controlled by clock pulses, whereas the sets of AND gates 9, 10, 11, 14 and 15 are controlled by clocked microcommands. Each set receives at its input terminals, and releases at its output terminals, if enabled, a plurality of suitable signals, on a set of wires represented by a single line and called hereafter a "channel".

A set of signals, representative of a prefixed ROS address in binary form, may be transmitted on channel 8, which is not conditioned by any set of AND gates.

To initiate the operation of the computer, this address may be forced on this channel, for instance by pre-setting suitable switches on a control console, and by pressing a START button which, through the wire START, initiates the operation of the clock unit.

The address thus present on channel 8 is loaded in register ROSAR, and, as soon as the set of AND gates 12 is enabled by a clock pulse, the ROS memory is addressed; a microword is read out, through the set of gates 16, and is loaded in ROR register 3.

The same microword, now present at the output leads of ROR register 3, is decoded by decoder 4, and the decoded signals are transferred to the clock network through a network of AND gates, and emerge therefrom as clocked microcommands.

The ROS address, contained in register 5, may be updated in different ways.

First, it may be loaded through the set of AND gates 13 into the ROSAR register 1, and, from there, through the enabled set of AND gates 14, is applied to the counting network 7, where it is, for instance, increased by unity. The updated address is then loaded again in ROSAR register 5, through channel 17 and the set of AND gates 11.

Alternately, the address may be incremented by a suitable quantity K obtained from the microword recorded in ROR register 3, and applied to the counting unit 7 through channel 18 and gates 15.

By another alternative, the new address of ROS may be obtained from the microword read out from the ROS and contained in ROR register. A suitable number of bits may be transferred through channel 18 and the gates 10 to the ROSAR register 5.

Figure 2:
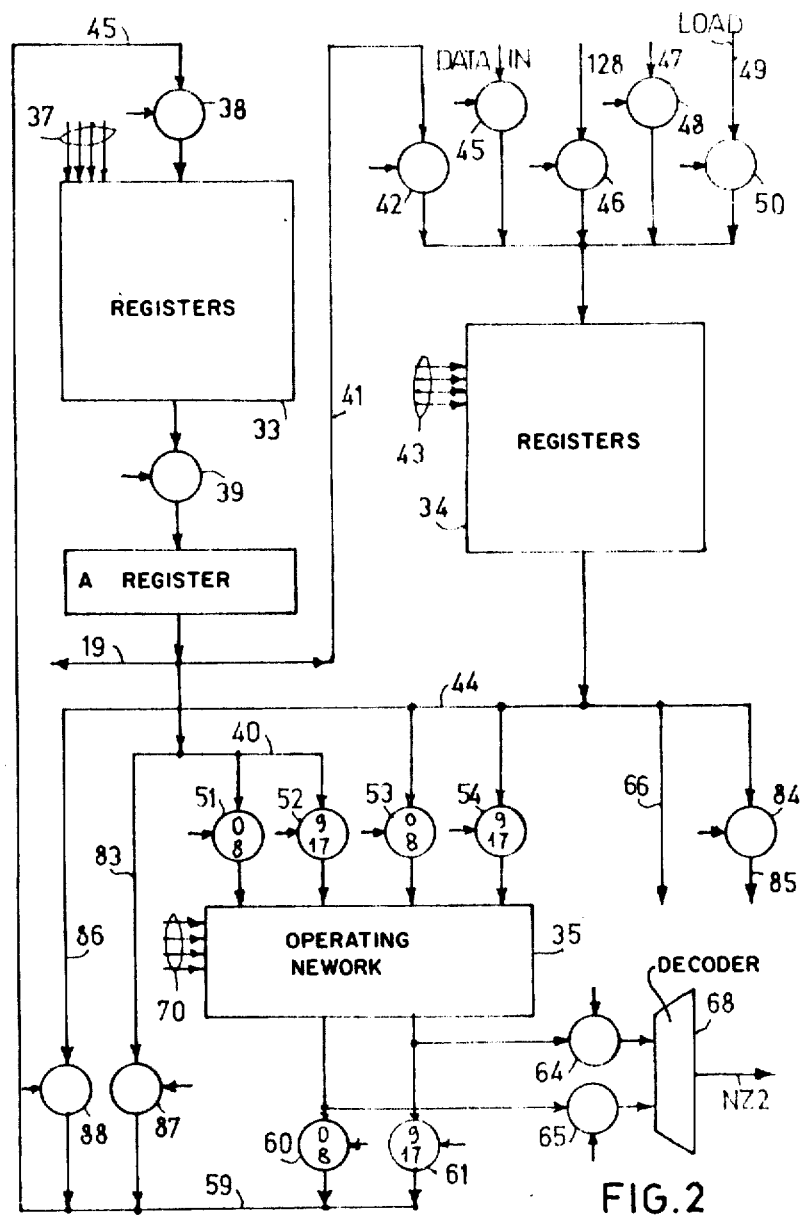
FIG. 2 is a simplified block diagram of the operating section of a computer controlled by the control unit according to the invention.

A further addressing facility is offered by channel 19, controlled by the set of gates 9, which permits loading in register 5 the content of register A, which is one of the several registers comprised in the operating section of the computer, as shown by FIG. 2. The content of said register may originate, as it will be seen below, either from other registers of the operating section, or from an external peripheral unit, and also from the main memory; therefore, the ROS may, generally speaking, be addressed by any source of information within the computer or connected to the same.

The length, in bits, of the ROS addresses, depends on the number of ROS memory positions which must be addressed, and is independent of the length of the microwords read out from the ROS.

For instance, the ROS addresses may have a length of 15 bits, and are therefore capable of addressing typically 32,000 different memory locations.

This means that all the channels employed for loading the ROS addresses comprise 15 wires, and that registers 5 and 6 have 15 bit positions.

The register 3, on the contrary, has as many bit positions as are the bits forming the microwords, for instance 18. This means that, if the ROS address is obtained from a microword contained in the ROR register, only 15 of the 18 bits are employed as address and transferred through channel 18.

According to the invention, the microprogram memory ROS is associated with main memory so that microprogram microinstructions may be accessed from ROS or from main memory, during the development of the microprogram.

To this effect, a microinstruction address comprises a bit specifying whether it is an ROS address or a main memory address. This bit may be registered in flip-flop 24, associated with the ROSAR register, and it is named bit M/R. As seen on FIG. 1, this flip-flop may be loaded by a bit delivered on a wire of those wires forming the channel 19, through the AND gate 9'.

Alternately, it may be loaded with a specific bit of the microinstruction contained in register ROR, through the channel 18 and the AND gate 10'.

Furthermore, the content of flip-flop 24 may be forced through the wire 8' by a console key. The ways for loading the flip-flop 24 will be described infra.

The execution of a machine primitive instruction recorded in main memory requires addressing it, reading it out, and transferring it; these operations must be controlled by a sequence of microinstructions.

These microinstructions are conveniently generated by a hardware sequencer suitably connected to the portion of the control unit already described. According to the invention, this sequence is such as to allow the overlapping of the executive phase of a microinstruction to the calling phase of the following microinstruction.

FIG. 1 shows the simplified block diagram of the whole control unit according to the invention, and includes also the hardware sequencer and the related connections to the control unit, together with the modifications needed for putting the invention in effect.

The hardware sequencer is represented by block 25. Later, a preferred embodiment of the sequencer will be described in detail with reference to FIG. 4. For the moment it is sufficient to point out that the hardware sequencer consists of a binary counter, typically of 2 bits.

The sequencer is stepped at each machine cycle by a clock pulse applied to a suitable input lead 22.

The clock pulse, however, has effect only when the flip-flop 24 is set; that is, when its output is at binary level 1.

The output acts as enabling signal for the hardware sequencer 25. This signal is applied by means of wire 23.

An auxiliary register 27 named RORM is provided for receiving information from the main memory through the set of AND gates 28 and the channel 29.

The register RORM is designed for storing information having the character of microinstructions, and therefore it is convenient that its parallelism be the same as that of the ROS memory, in order that it may store binary information of the same length as the microinstructions.

In the case where particular bits of the microinstructions contained in ROS are redundant bits for controlling, for instance, parity check bits, and hence are not essential for generating microcommands, then the RORM register may have shorter length, equal to the real length useful for the microinstructions.

The register RORM is also connected through the set of AND gates 30 to the input leads of register ROR, and therefore it is possible to transfer to register ROR the information contained in register RORM simply by enabling the set of AND gates 30.

The output leads 31 of the hardware sequencer 25 are connected through the set of AND gates 32 to the command generating network 4A.

This network may conveniently consist of a plurality of OR gates, AND gates and a flip-flop. It receives, at its inputs, the outputs of the hardware sequencer as well as those of the decoder network 4.

According to an aspect of the invention, the output terminals of register RORM are also connected through the set of gates 301 to a decoder 302, while the output terminals 303 are in turn coupled to the microcommand generating network 4A, and may control, according to their binary level, some output signals of the same.

According to another aspect of the invention, the output signals of the decoder 302 are also applied, by means of the wires 304, to the hardware sequencer 25, and may control, by their binary level, its operation.

The combined use of these features permits the overlapping of the read-out operation of a microinstruction with the execution of the preceding microinstruction, thus reducing the operating time of the computer when the microprogram directing the control unit is recorded in the main memory.

Later on, the hardware sequencer and its connections to the control unit will be described in detail with reference to FIG. 4.

THE OPERATING SECTION

FIG. 2 shows a simplified block diagram of the operating section of the computer, which is hereby described for the sake of completeness of the description.

It consists substantially of two banks of registers 33 and 34, of a register A, and of an operating network 35.

The register bank 35, typically, comprises 16 registers having 18 bit locations each, and is addressed by a code of microcommands through the input leads 37.

By means of such addressing, and by controlling either the set of gates 38 at the input terminal of the register bank, or the set of gates 39 at the output terminals of the same, a piece of information coming in from the channel 45 may be recorded in the address register, and, alternately or concurrently, the information already contained, or being recorded in the address register, may be loaded also in register A.

The content of register A is in turn applied to the distributing channel 40 and, through the operation of the gates, may selectively be applied to the operating network 35.

The content of register A may also be transmitted through channel 41 and set of gates 42 to the register bank 34. This bank may also comprise 16 registers having 18 bit locations each, and be addressed by a code of microcommands through the input terminals 43.

The content of the address register is always available on the distributing channel 44 and may be applied selectively to the operating network 35 through the gates 53 and 54.

The address register in the register bank 34 may in turn be loaded with information generated by several sources. It has already been explained how the data contained in A may be transferred to the bank 34 through the channel 41 and AND gates 42. Another possible source is a data channel originating from external peripheral units. Such channel is identified by the reference label DATA IN, and is controlled by the set of gates 45.

Figure 3:
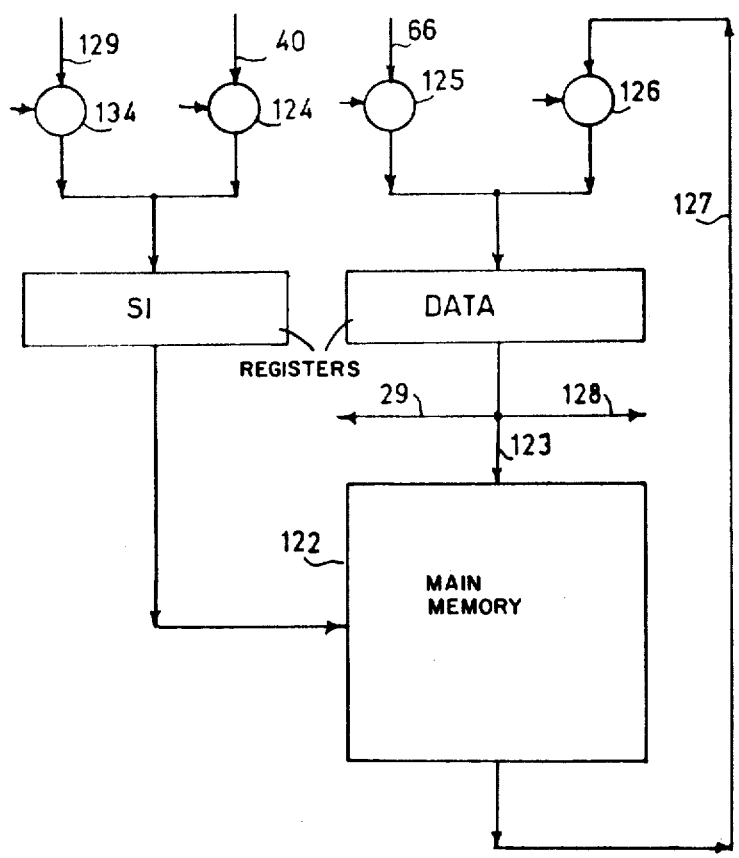
FIG. 3 is the simplified block diagram of a main memory section of a computer utilized by the invention.

The data coming in from the main memory on channel 128 of FIG. 3 is transferred to the register bank 34 through the set of gates 46 to be processed by the operating section. Also the read-only microprogram memory ROS may send data to the bank 34 for recording therein; for this effect a connecting channel 47 (FIGS. 1 and 2) is provided between the output of the register ROR and the register bank 34. This channel is controlled by the set of gates 48.

It is also possible to force on the register bank 34 any prefixed piece of information through a channel 49 (LOAD) controlled by the set of gates 50.

The channel 49 may be fed by information generated by the console switches controlled by the operator.

The register banks 33 and 34 may be controlled in parallel, for addressing one, and only one, register at a time in each one of the banks.

In case of the bank 33 this is evidenced by the register A, but the same is true also for the bank 34 which, in respect of the operating structure of the computer, is seen, at any time, as a single register which is denoted register B in this discussion but not in the drawing.

The registers A and B provide the required contemporaneous physical support for two sets of data which are presented for processing to the operating network.

The operating network is connected to registers A and B by means of distributing channels 40 and 44 and by means of a number of gates.

The gates are conveniently organized in sets, according to the format of the data to be processed (binary, packed or unpacked decimals), to the type of operation to be performed, to the parallelism of the registers and of the operating network.

In the example under consideration, the register and the operating unit 35 may have for instance a parallelism of 18 bits; this allows the performance of predetermined operations on two bytes in parallel, without excluding the possibility of operating on a single byte at a time.

For this purpose, the gates connecting the inputs of the operating network 35 to the distributing channels 40 and 44 are divided in sets respectively indicated by reference numerals 51 to 54.

The block representing each set carries the order number of the bits transferred by the set. In a like manner, the output terminals of the operating network are connected to a collector channel 59 through the set of gates 60 and 61.

The output terminals of the operating network are also connected through AND gates 64, 65 to a decoder 68 which is responsive to predetermined output codes, such as "all zeros" or "all ones" codes, for the bits corresponding to the enabled gates.

The signal NZ2 at the output of the decoder is a signal of "condition verified", which is used, when needed, for submitting the performed operations to suitable checks.

The operating unit may be implemented according to well known electrical circuits, preferably employing integrated circuit technology. A detailed description of such operating networks may be found in the extensive literature available on the design of electronic computers, among which the authoritative text by R. S. Lesley: "Digital computers and control engineering", part 4, published by McGraw-Hill, is herein cited.

Moreover, the U.S. patent application Ser. No. 485,468, filed on July 2, 1974 by the Applicant, describes a specific embodiment, wherein the operating unit comprises different networks functionally independent, and this application may be referred to for further details.

The operating network should in general perform operations of the following types: arithmetical binary or decimal operations; logical operations such as AND, OR, EXCLUSIVE OR, COMPARE; data shift; incrementing incrementing decrementing operations by one or more units.

The type of the operation required is defined by a set of microcommands 70 received from the control unit.

To complete the description of the operating section it may be remarked that the collector channel 59 is connected to channel 45, and that, therefore, the data present on the collector channel as a result of operations performed by the unit 35, may be transferred and recorded in a suitable register of the bank 33, and from there, to register A, then to the bank 34 for recording, and if wanted, to the main memory, or for transferring to an external peripheral unit through channel 66, or through channel 85 and the set of gates 84. Channel 66 is connected (FIG. 3) to the main memory; channel 85 is connected to the output terminals of the set of gates 84 and is intended to transfer information from the computer to the peripheral devices by means of a control network directing the exchange of information, whose description is irrelevant for the understanding of the invention and is therefore omitted.

The operating section comprises also two by-pass channels 83 and 86, controlled by the set of gates 87 and 88, for directly connecting the distributing channels 40 and 44 to the collector channel 59.

In addition, a number of flip-flops, not shown, are provided for recording special conditions, as the presence of "carry in" and "carry out", and the results of checks operated by specialized decoders.

THE MAIN MEMORY SECTION

FIG. 3 shows a block diagram of the memory section of the computer.

Substantially, the memory section comprises a main memory 122, for instance a magnetic core memory, having a parallelism of 18 bits, an addressing register SI, a data register designated DATA and a number of communication channels. The addressing register SI receives from the channel 40 (FIGS. 2 and 3), through the set of AND gates 124, coded information stored in register A, which, as previously noted, is comprised of the operating section illustrated in FIG. 2.

The register SI has a capacity adapted to the maximum capacity foreseen for the memory.

For instance, a register having 18 bit locations may address substantially 256,000 memory positions, and is compatible with the parallelism of the described computer.

The data to be written in the memory is transferred to the DATA register through channel 66 controlled by the set of AND gates 125 and is delivered, as already seen, from the register B of the operating section.

The data recorded in the DATA register is written in the memory positions addressed by means of the channel 123.

The data read out from the memory 122 is transmitted through the channel 127 and loaded, through the set of gates 126, in the DATA register, and therefrom is applied through channel 128 to the register B, already noted in the description of the operating section.

An additional channel 129, at the output of the register ROSAR and controlled by the set of gates 134, is provided for addressing the memory. Through this channel a microinstruction address is loaded in register SI, and addresses a location in the main memory in place of a location in the ROS.

The output of the DATA register is also connected both to register B through channel 128, and to register RORM (27, FIG. 1) through the channel 29 and the set of gates 28, so that the content of the DATA register may be used as a microinstruction by the control unit.

In other words, there is a direct exchange of information from the main memory to the control unit, and of addresses from the control unit to the main memory. This was not provided in the prior art, wherein the control unit operated only in order to control the set of gates which provide for the exchange of information in other ways than as herein provided by the invention.

THE HARDWARE SEQUENCER

Having described in general the structure of the computer, it is now possible to examine in more detail an embodiment of the hardware sequencer and of the associated circuits.

Figure 4:
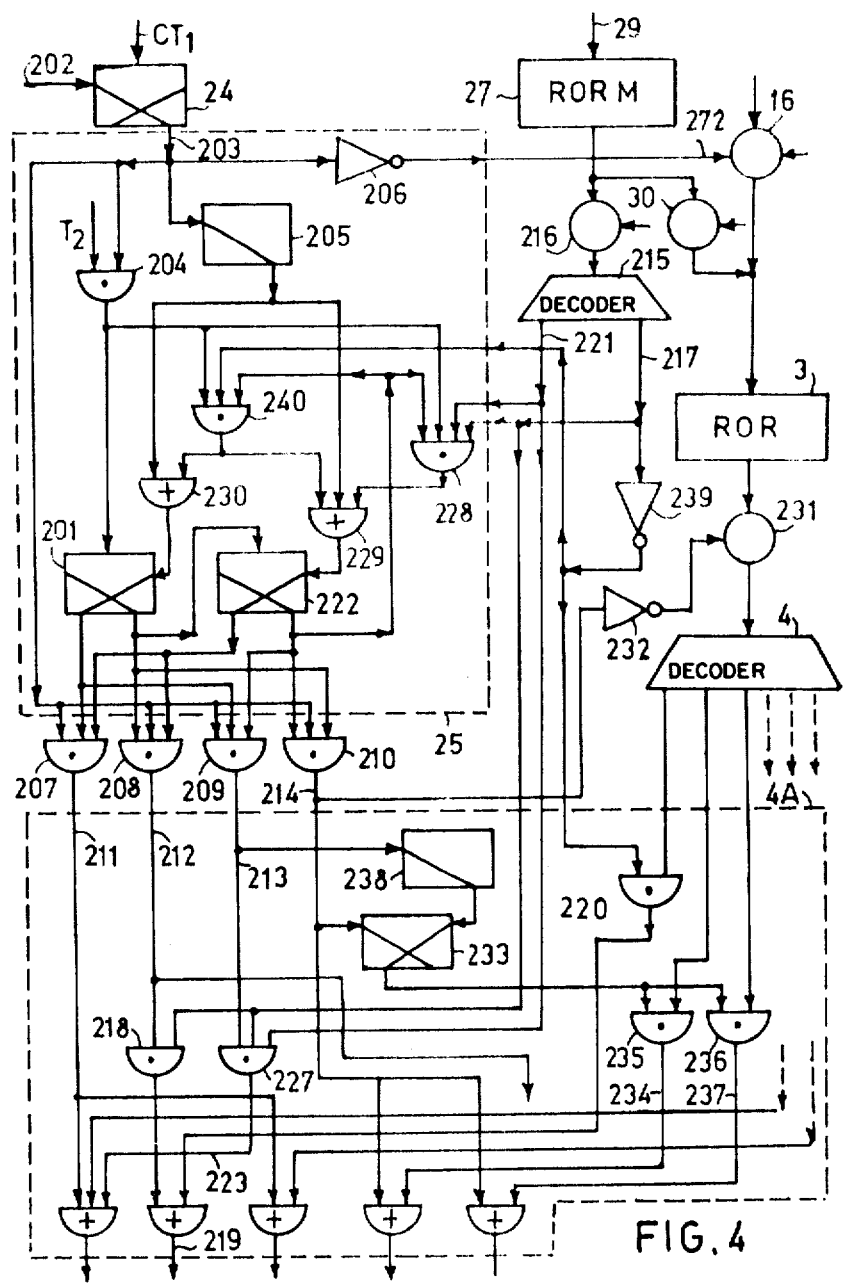
FIG. 4 shows in detail the logic block diagram of a portion of the control unit represented in FIG. 1.

FIG. 4 shows a preferred embodiment of the hardware sequencer 25 of FIG. 1.

It comprises, substantially, two interconnected flip-flops 201 and 222.

A flip-flop 24, associated to the register ROSAR, provides a bit signal which specifies where the microinstruction to be read out is stored. It is loaded, in response to a clocked microcommand $CT_1$, with the information applied to its input 202, connected to one of the wires of the channel 19, which is employed also for loading the register ROSAR from the register band 33, or, alternatively, to one of the wires of the channel 18, or, also, to one of the wires provided for forcing data from the console (not shown).

The direct output lead 203 of the flip-flop 24 is connected to an input of a two-input AND gate 204, to the input of a one-shot circuit 205, to the input of an inverter 206 and to an input of the set of AND gates 207 to 210, which control the outputs 211 to 214 of the hardware sequencer. The output of the one-shot circuit 205 is connected to the reset inputs of flip-flops 201 and 222, through the OR gates 229 and 230.

The output of the inverter 206 is connected to one input 272 of the set of gates 16 (FIG. 1) that controls the loading of the ROR register from ROS.

The output of the AND gate 204, having its second input subject to a clock pulse T2, controls the clock input of the flip-flop 201.

When, at the beginning of a machine cycle, or at the end of the previous one, the microcommand $CT_1$, which is generated only in response to a proper microinstruction, allows the loading of the flip-flop 24, and the signal level present at the input is a 1 signal level, when the flip-flop is set, the signal level of wire 203 changes to, or remains, at a 1 signal level, and, through the inverter 206, inhibits the set of gates 16.

Thus the ROS is prevented from loading into the register ROR the addressed microinstruction.

At the same time, if the logic signal level present on wire 203 changes to level 1 (which happens if the control is switched from an ROS address to a microinstruction address of the main memory), the rising edge of the signal at the input of the one-shot 205 triggers the same, which delivers at its output terminal a short pulse which resets both flip-flops 201 and 222 of the hardware sequencer, in case they were in "set" state.

The clock pulse $T_2$ is superimposed to this pulse, and, when the one-shot is operating, it falls within the duration interval of the pulse delivered by the one-shot, and therefore does not interfere with the resetting action of this pulse.

Therefore, at the beginning of the first machine cycle requiring the intervention of the hardware sequencer, the inverted output terminals of both flip-flops and the direct output terminal of the flip-flop 24 go over to logic signal level 1.

The output terminals of the AND gates 208, 209 and 210 remain, as seen from the connections represented in FIG. 4, to logic signal level 0. The signal present on wire 211 is applied to the logic network 4A, and provides the generation of a number of microcommands.

The logic network 4A is substantially comprised of OR gates, and provides for the generation of microcommands, both in response to the signals received by the logic network 4 (microinstructions) and from the wires 211 to 214.

The microcommands generated by the wire 211 control, during the machine cycle, the reading out from main memory of the information at the address, specified by the register ROSAR.

This means specifically, the generation: of a microcommand enabling the set of gates 134 (FIG. 3), for loading the content of ROSAR in register SI; of other microcommands for reading out data from memory; and of a microcommand enabling the set of gates 126, for loading the data read out from the memory into the register DATA.

By the following (second) machine cycle, since no clocked microcommand $CT_1$ is generated, the state of the flip-flop 24 does not change. The clock pulse $T_2$, however, sets the flip-flop 201.

It may be seen from FIG. 4 that on wire 212 a logic level 1 signal appears, whereas on wires 211, 213, 214 the signal is at level 0.

The signal on wires 212 generates other microcommands for different purposes; namely, that of enabling the set of gates 28 (FIG. 1), thus transferring the information from register DATA to register RORM through the channel 29.

Towards the ends of this cycle, the microinstruction to be executed is available in register RORM.

According to the invention, the microinstruction, before being executed, is examined for verifying some characteristics. The microinstruction may, for example, require a conditioned or unconditioned jump operation, or an operation for reading out from the memory.

If the microinstruction is not a jump microinstruction, it is known that the reading out of the following microinstruction takes place after incrementing by unity the preceding address, and this incrementing may be operated immediately. The decoder network 215 tests if this condition is verified.

As soon as the microinstruction is in the register RORM, a clocked microcommand, generated by the hardware sequencer, enables the set of AND gates 216 and applies the microinstruction to the decoder 215.

If the microinstruction does not require a jump operation, a signal is generated on wire 217, which enables the AND gates 218, and therefore the hardware sequencer generates one or more additional microcommands (wire 219) which increment by unity the content of register ROSAR 1, and transfer the updated content to the register ROSAR through the channel 17 and the set of gates 11 (FIG. 1). At the end of the second machine cycle, therefore, if the microinstruction is not a jump microinstruction, the address of the following microinstruction is already available in register ROSAR.

At the beginning of the third machine cycle, the clock pulse $T_2$ causes the sequencer to step on again, therefore generating a level 1 signal on wire 213. Thus a new set of microcommands is generated, which control the loading, in register ROR, through the set of gates 30, of the microinstruction having been read out from the memory and contained in RORM.

The read out microinstruction is therefore executed in this machine cycle.

Specifically, the microinstruction is decoded by the network 4, which generates a set of microcommands.

If the microinstruction is not a jump microinstruction, the updating of the address for reading out the following microinstruction has been already carried out in the preceding machine cycle. Therefore a further updating of the address must be prevented by inhibiting the updating microcommands which otherwise would be generated by the decoder network 4. This is obtained by using the signal yet present on wire 217 as a control signal, which, being inverted by the inverter 239, inhibits the microcommand, or the set of microcommands, by means of the AND gate 220. (It must be kept in mind that the register RORM is still loaded.) This expedient is needed for maintaining the microinstructions recorded in the main memory in the same format and extent to the corresponding microinstructions recorded in the ROS.

If the microinstruction is a jump microinstruction, the information contained in the microinstruction is used, in this machine cycle, for loading the register ROSAR with the new address, either through the channel 18 and the set of gates 15, or, alternately, through the set of gates 10 (FIG. 1). This operation is performed at the end of the machine cycle.

During the same machine cycle the microinstruction to be executed is tested in order to verify another condition. The microinstruction may require read and/or write operations in the main memory; that is, operations which engage the main memory and its communication channels. On the other hand, it may require operations, which do not engage the main memory.

The testing for this condition is effected by the decoder network 215, to which the content of register RORM is applied through the set of gates 216.

If the microinstruction does not require operations affecting the main memory, a signal to this effect is generated on wire 221. In this case the main memory is available, and the same machine cycle may be employed for reading out the following microinstruction from the main memory.

It is, of course, necessary also that the condition, that the microinstruction to be executed is not a jump instruction, be verified; that is, the updating of the address must already have taken place in the preceding cycle.

Therefore, both the signals on wires 217 and 221 are at level 1, and AND gate 227 is enabled, and the signal on wire 213, which generates a number of operating microcommands, is also transferred through the AND gate 227, and generates (wire 223) an additional number of microcommands for reading out the main memory at the address specified by ROSAR.

Thus, the operation of reading out the new microinstruction, and that of executing the preceding one, overlap on the same machine cycle.

On the other hand, if the microinstruction requires a jump operation, this operation is executed, but the reading out, at the same time, of the new microinstruction from the main memory cannot take place and is postponed to the following cycle.

Lastly, if the microinstruction requires a reading or writing operation in the main memory, or an operation engaging in any way its communication channels, even in this case the operation cannot be effected at the same time with the reading out of the new microinstruction, which must be postponed.

We shall return later to consider the behavior of the hardware sequencer in the third intervention cycle, when the microinstruction requires operations which engage the memory channels. However, it may be, right now, remarked that, at the end of this cycle, the subsequent behavior of the hardware sequencer must be modified according to the verified conditions.

The possible conditions are three in number:

1. The microinstruction to be executed is neither a jump, nor a main memory write-read microinstruction.

In this case, as the following microinstruction has already been read out from the main memory, the hardware sequencer must be brought back to the state corresponding to the second cycle.

Therefore, the wires 217 and 221 are connected to the input terminals of an AND gate 228, which is enabled by the output signal from AND gate 204; that is, by the clock signal $T_2$, and by the direct output of the flip-flop 222. The output of the AND gate 228 resets the flip-flop 222 through the OR gate 229.

Thus, at the beginning of the fourth machine cycle the flip-flop 201 is set and the flip-flop 222 is reset. This state corresponds to the second cycle of the hardware sequencer. The operations that, as aforesaid, are effected in the second cycle, are now repeated, and the new microinstruction is loaded in register RORM.

2. The read out microinstruction is a jump microinstruction. In this case the address of the new microinstruction is available only at the end of the third machine cycle.

If the new address of the microprogram shifts the control to an ROS position, the flip-flop 24 has been reset at the end of the third cycle, and therefore the hardware sequencer is inactivated.

On the other hand, if the new microprogram address is a main memory address, the hardware sequencer must be reset to the initial position corresponding to the first cycle. To this purpose, the output of the inverter 239, the direct output of the flip-flop 222, and the output of the AND gate 204 are connected to the inputs of the AND gate 240. When this gate 240 is enabled at the beginning of the fourth machine cycle by the clock pulse $T_2$, the flip-flops 201 and 222 are, respectively, maintained, and put in the reset state by the output of the AND gate 240 connected to the reset inputs through the OR gates 230 and 229. The action of the clock pulse $T_2$ on the clock input of the flip-flop 201 is masked by the presence at the same time of a reset pulse on the reset input.

The operations effected, as aforesaid, during the first machine cycle by the sequencer are thus repeated, and the main memory is addressed by the new address contained in ROSAR.

3. The called microinstruction is a read-write microinstruction for the main memory.

In general, the time needed for reading or writing in the main memory may be longer than a single machine cycle. It is assumed that memory operations require two machine cycles. More precisely, a write operation is controlled in a first cycle by a microinstruction performing the transfer of data from a work register in the DATA register, and the actual writing in memory. In a second machine cycle a "no-operation" microinstruction keeps the control unit in idle state for permitting the memory unit to complete the writing operation.

Similarly, a read-out operation is controlled during a first memory cycle by a microinstruction effecting the actual reading out from the memory, and the loading of the read-out data into the register DATA. In a second machine cycle, a microinstruction transfers the information from the register DATA to the register B, or to a register of the bank 33.

All these instructions engage the memory channels.

In this case the behavior of the hardware sequencer must be reconsidered, beginning from the third cycle.

In the third cycle the read-write microinstruction is effectively initiated. However, at the end of the third cycle it is not possible to address again the main memory for reading out the following microinstruction, because the read-write operation is not completed, and the DATA register of the main memory is occupied by the read-out information. Therefore the clock pulse $T_2$ at the beginning of the fourth cycle sets the flip-flop 201, while the flip-flop 222 remains set. A level 1 signal is generated on wire 214, and this signal, inverted by the inverter 232, inhibits the set of gates 231 at the output of the register ROR and, at the same time, being applied to the network 4A, it generates microcommands which provide for transferring the content of the register DATA in a suitable register of bank 34 (register B).

The same signal sets the flip-flop 233. At the beginning of the fifth cycle the hardware sequencer is reset to the initial state by a new clock pulse $T_2$. As foreseen, the read-write microinstruction is necessarily followed either by a no-operation instruction, or by a microinstruction for transferring the content of the register DATA to the register B, or to a register of bank 33.

As the information has been thus "saved", being transferred from the DATA register to register B, the new microinstruction may now be read out from the main memory by the first two cycles of the hardware sequencer, which are now repeated.

During the third sequencer cycle, the microinstruction is executed as required.

Specifically, if the read-out microinstruction is a no-operation microinstruction, following the operation of writing into the memory, no microcommand is generated. The machine cycle is an idle one.

If the called microinstruction requires the transferring of the information, previously read out, from the register DATA to register B, this command is not executed because the operation has already been performed. This command is inhibited by means of the flip-flop 233.

The inverted output of this flip-flop, applied to the AND gates 235 and 236, inhibits, for example, the transfer of signals on wires 234 and 237, which may be assumed to transfer the microcommands related to the indicated operation.

If the called microinstruction requires the transfer of the read-out information previously read out from the DATA register to a register of the bank 33, this command must be executed only partially, because the operation has been already partially performed.

In this case the inverted output of the flip-flop inhibits, as before, the transferring of the signals on wires 234 and 237, thus preventing the transfer of the information from the register DATA to the register B, but allowing the transfer from register B to a register of the bank 33.

At the end of the third sequencer cycle, finally, the falling edge of the signal on wire 213 triggers a one-shot circuit 238, which emits a pulse resetting the flip-flop 233.

It is clear that, as the considered microinstructions are neither jump nor read-write microinstructions, in the following cycle the hardware sequencer assumes the condition corresponding to the second sequencer cycle.

From the above description it appears clearly that, in case of microinstructions recorded in the main memory, which are neither jump microinstructions nor read-write microinstructions, nor microinstructions immediately following a read-write microinstruction, the overlapping of the operations for executing a microinstruction with the operations for reading out the following one, requires an execution time, for both microinstructions, equal to two machine cycles.

In the above specified cases the time is longer, and more specifically, equals three machine cycles for jump microinstructions or for microinstructions immediately following read-write microinstructions, and equals four machine cycles for read-write microinstructions.

A further aspect of the invention, worthy of consideration, is that the described control unit provides for calling microprograms recorded in the main memory, in effectively reduced execution times, by means of said overlapping of execution and calling operations, without requiring any modification of the microprograms recorded in the main memory in respect to those recorded in the ROS.

In other words, a prefixed microprogram may be recorded in one or in the other memory, and will in any case be executed correctly.

To complete the description it remains now to consider how, from a sequence of microinstructions recorded in ROS, the control may be switched to a sequence of microinstructions recorded in the main memory, and vice-versa.

This is easily obtained by a jump microinstruction. In other words, a microinstruction, which is assumed to be recorded in ROS, may specify a new microinstruction address and the support where the same is contained. For instance, the format of the microinstruction may be as follows:

Bits 0–3: function code. These bits are employed for generating microcommands which control the enabling of the gates 10 and 10'.

Bit 4: microinstruction support. This bit specifies whether the addressed microinstruction is recorded in ROS or in the main memory.

Bits 5–18: microinstruction address. These bits specify the address of the microinstruction.

It is not required that the address bits be able to address all the ROS, or the main memory, positions, but they may address only part of these.

By means of the microcommands generated by the bits 0–3, the bit 4 is recorded in flip-flop 24 and the bits 5–18 are loaded in a part of the register ROSAR.

In the following machine cycle, according to the content of flip-flop 24, either the ROS is addressed, or the operation for calling the following microinstruction from the main memory, by means of the hardware sequencer, is initiated.

It is clear that this jump microinstruction may similarly be, on the other hand, recorded in the main memory and switch the control back to the ROS, or send it to another address of the main memory.

The above description of a control unit and of a hardware sequencer relates to a preferred embodiment of the invention. It is self-evident that, with reference to the general organization of a computer, and to the specific time requirements which may be needed, modifications of the control unit may be carried out, without departing therefore from the spirit and scope of the invention.

I claim:

1. In a microprogrammed computer having a main memory adapted to store microinstructions, sets of microinstructions forming microprograms; a main memory address register for storing the address of a location in main memory; and a main memory output register for storing data read out of a location in main memory corresponding to the address stored in the main memory address register; the improvements comprising:

a microprogram memory for storing a plurality of microprograms;

a microinstruction address register for receiving and storing the address of a microinstruction, the address including data identifying the microprogram memory or the main memory as the memory in which each microinstruction is stored;

a microinstruction register for storing microinstructions;

auxiliary register means;

means for applying the data identifying the memory in which a microinstruction is stored to the auxiliary register, the auxiliary register providing an output identifying the memory in which the microinstruction in the microinstruction address register is stored;

first address channel means including gate means for selectively connecting the microinstruction address register to the microprogram memory to apply the address stored therein to the microprogram memory;

second address channel means including gate means for selectively connecting the microinstruction address register to the main memory address register to apply the address stored therein to the main memory address register, whereby data stored at the addressed location in main memory is written into the main memory output register;

first output channel means, including gate means, for selectively connecting the microprogram memory to the microinstruction register to transfer data stored at an addressed location in the microprogram memory to the microinstruction memory register;

an intermediate register;

second output channel means, including gate means, for selectively connecting the main memory output register to the intermediate register, said intermediate register storing the contents of the main memory output register therein and for connecting the intermediate register to the microinstruction register to transfer data stored in the intermediate register to the microinstruction register;

a logic sequencer circuit;

circuit means for applying the output of the auxiliary register means to the logic sequencer;

a decoder network connected to the intermediate register to test instructions stored therein to determine if the instruction is a jump microinstruction and to produce outputs identifying the presence or absence of a jump microinstruction;

circuit means for applying the output of the decoder network to the logic sequencer circuit, said logic sequencer circuit, if the output signal from the auxiliary register means identifies main memory as the location of the microinstruction whose address is in the microinstruction address register and if the microinstruction is not a jump instruction, generating a sequence of microcommands;

a conditioning network connected to the logic sequencer and responsive to microcommands produced by the sequencer circuit for applying appropriate control signals to the gates of the channels for enabling and inhibiting selectively said channels to cause the reading from main memory of a microinstruction during the execution of the preceding microinstruction.

2. In a microprogrammed computer as defined in claim 1 in which the logic sequencer circuit is a binary counter having two bistable elements.

3. In a microprogrammed computer as specified in claim 1 in which the microprogram memory is a read only store.

* * * * *

UNITED STATES PATENT OFFICE
CERTIFICATE OF CORRECTION

PATENT NO. : 3,956,738
DATED : May 11, 1976
INVENTOR(S) : Giancarlo Tessera

It is certified that error appears in the above-identified patent and that said Letters Patent are hereby corrected as shown below:

Assignee: Honeywell Information Systems Italia
Caluso, Italy

Signed and Sealed this

Twenty-eighth Day of September 1976

[SEAL]

Attest:

RUTH C. MASON
*Attesting Officer*

C. MARSHALL DANN
*Commissioner of Patents and Trademarks*